Figure 1:
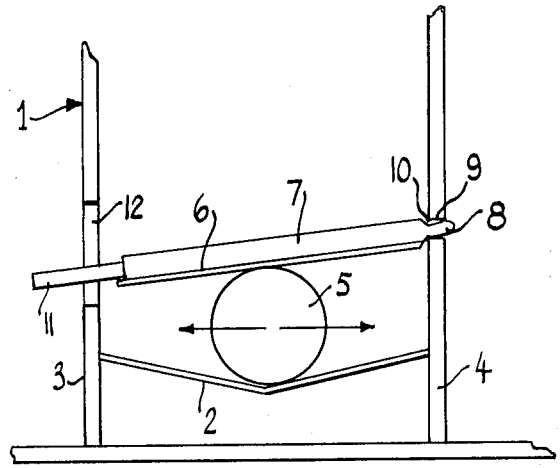

March 1, 1966 R. A. PROCTOR 3,237,729
INERTIA OPERATED MECHANISM

Filed March 23, 1964 5 Sheets-Sheet 1

Inventor:
Ronald Allan Proctor
BY Baldwin & Wight
Attorneys

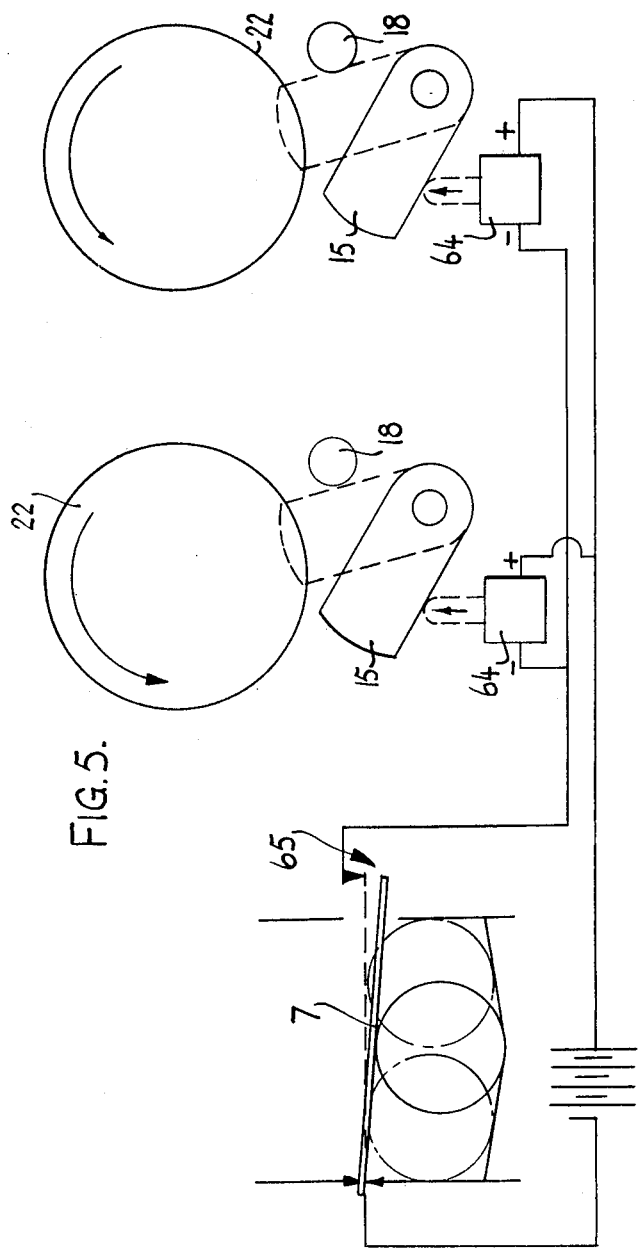

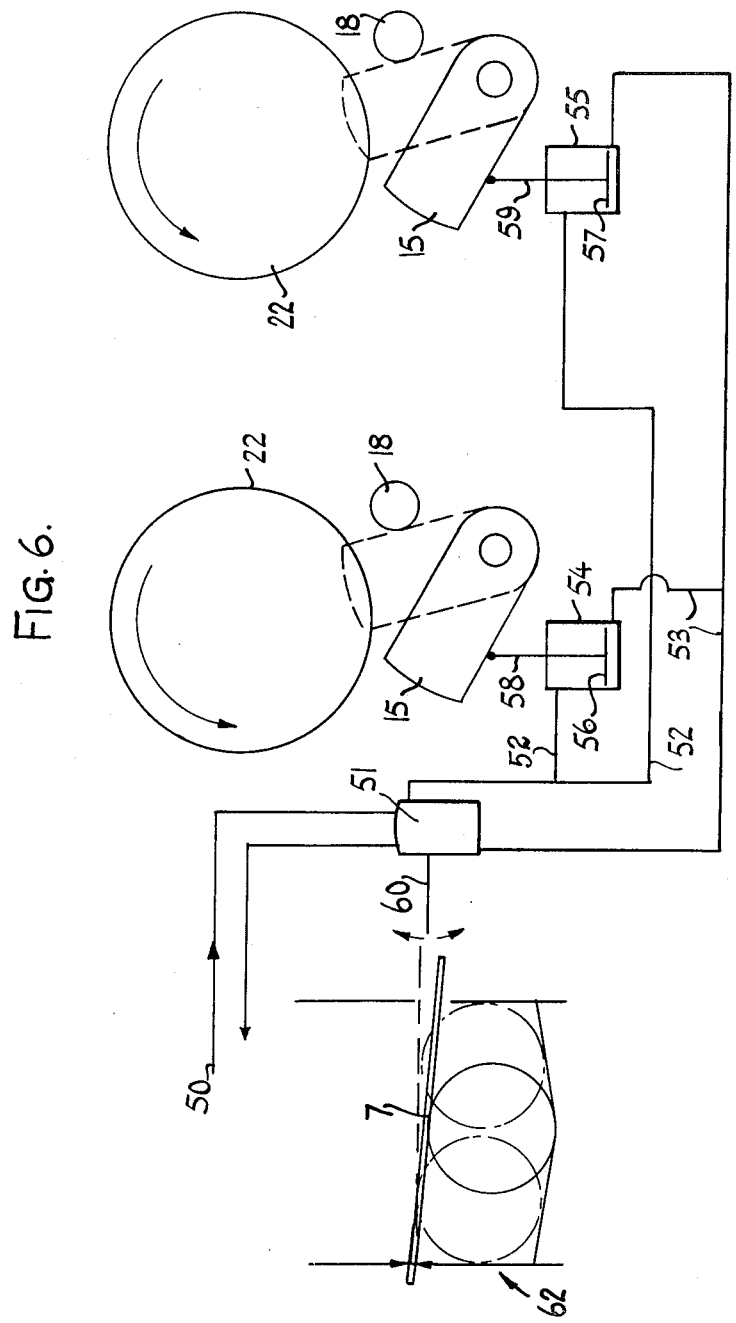

March 1, 1966  R. A. PROCTOR  3,237,729
INERTIA OPERATED MECHANISM
Filed March 23, 1964  5 Sheets-Sheet 5

INVENTOR
RONALD ALLAN PROCTOR

BY Baldwin & Wight
ATTORNEYS

United States Patent Office

3,237,729
Patented Mar. 1, 1966

3,237,729
INERTIA OPERATED MECHANISM
Ronald Allan Proctor, Woking, Surrey, England, assignor to Britax (London) Limited, Byfleet, Surrey, England, a company of the United Kingdom
Filed Mar. 23, 1964, Ser. No. 353,841
Claims priority, application Great Britain, Mar. 25, 1963, 11,644/63
19 Claims. (Cl. 188—136)

The invention relates to safety belts, which term is to be understood as including the various kinds of harness provided for the occupants of for example motor vehicles and aeroplanes. It is desirable for safety belts to include a storage portion arranged so that the wearer of the belt can move away from his seat by withdrawal of, for example webbing from the storage portion, this being in normal use automatically returned to the storage portion under the influence of a spring or other means when the wearer returns to or sits back in his seat. The storage portion of belt is normally represented by, for example webbing or other strap or cord material wound upon a reel, associated with a return spring, but whatever mechanism is used for paying out and winding in the storage portion of the belt, this must be associated with an automatic locking device which will act to lock the belt in position in response to a change in motion or in direction of movement of the vehicle or the wearer of the belt such as might arise in the event of a collision.

Three different schemes have been proposed in the past. In one arrangement, the lock comes into operation automatically when the storage portion of the belt is withdrawn at a pre-determined velocity, so that for example a centrifugally actuated lock can be used. In another arrangement, the locking of the belt, that is of the storage portion of the belt, takes place automatically when the belt material is withdrawn from the storage portion at a predetermined acceleration regardless of the actual velocity of withdrawal. In a third arrangement, and it is with this type of arrangement that the invention is specifically concerned, the belt material in the storage portion is automatically locked in response to a predetermined deceleration or acceleration or to a sudden change in direction of movement of the withdrawal mechanism as a whole, corresponding to the deceleration or acceleration, or to a sudden change in direction of movement of the vehicle in which the wearer is travelling.

Prior proposals have included the provision of a heavy pendulum which holds down a spring loaded locking mechanism in its central position but which releases this when displaced sideways under the influence of inertia, also the provision of an inertia operated electrical switch which, when opened, releases an electro-magnetically withdrawn locking mechanism. It is an object of the invention to provide an inertia operated locking mechanism for a safety belt which is particularly simple in its construction, omni-directional in its response, and not primarily dependent on an electrical supply. It is a further object of the invention to provide a mechanical inertia lock for a safety belt which is self resetting.

The invention consists in an inertia operated locking mechanism for a safety belt, including an actuating arm which is mounted so as to be displaced upon movement of an inertia member in any direction from a central portion of a dished support the actuating arm being associated with a locking member adapted upon actuation to restrain the safety belt against movement in the withdrawal direction.

The locking member may act directly on the belt or it may be adapted to actuate a device arranged to apply a locking action upon the belt. Furthermore, the locking member may be adapted to lock in the withdrawal direction a housing for a storage portion of the belt.

Preferably, the locking member is arranged to mesh with a rotary portion of the housing and engage a stop in the locked position so that upon reverse movement of said housing (which may for example comprise a reel) the locking member is moved away from the stop and out of meshing engagement with said rotary portion. Alternatively, the locking member can be displaced upon lifting of said actuating arm, into wedging engagement with such rotary portion, so that reverse movement of said rotary portion will automatically tend to displace the locking member out of such wedging engagement. In either case, if the return movement of the housing takes place when the inertia member has been able to return by gravity to said central portion with concomitant lowering of the actuating arm, the mechanism is automatically reset. Such reverse motion will follow automatically upon momentary release of the harness from a forward pull.

In one arrangement the inertia member, which is most suitably spherical, rests in a generally conical dish so that when the mechanism is upright the inertia member will automatically rest on the bottom. Above this is mounted a plate pivoted at one side to rest directly on the inertia member, the size of the latter and the location of the pivot being arranged so that the plate is lifted automatically in whatever direction the inertia member is displaced. The plate is formed with an extension passing through an aperture in a casing for the inertia member and directly supports a toothed sector journalled so as to be lifted into engagement with a toothed wheel when the aforesaid plate is lifted upon sufficient displacement of the inertia member. This toothed wheel is arranged to rotate with a reel representing a housing for the storage portion of a safety belt in a sense such that the sector is carried forward when the reel is rotated in a withdrawal sense against the action of the return spring. A suitably mounted stop is located to arrest the forward and upward motion of the sector before it has swung so far as to disengage again from the aforesaid toothed wheel.

The inertia member will normally take the form of a ball bearing of for example ½"–1" diameter. The aforesaid plate and extension of course constitute the actuating arm, the latter expression being understood broadly to signify any suitable form of linkage which can be lifted by the inertia member to transmit the required mechanical movement to the locking member. In the case described above, the extension from the plate is preferably in the form of a circular section rod extending parallel to the axis of the toothed sector and upon which the sector rests directly.

The inertia operated mechanism comprising the aforesaid actuating arm, inertia member and dished support may be mounted remote from the locking member and housing for the storage portion of the belt, the locking member being actuated to lock the belt housing upon displacement of the actuating arm through remote control means.

With such an arrangement, a single inertia operated mechanism may serve to initiate locking of a plurality of housings, each having its own belt storage portion.

The remote control means may be a fluid circuit, for example a hydraulic or pneumatic circuit, or an electrical circuit between the actuating arm and the locking member or members. Furthermore, a mechanical linkage may be used.

Figure 2:
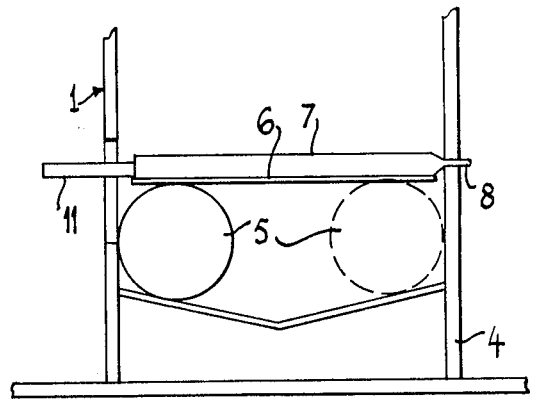
Figure 4:
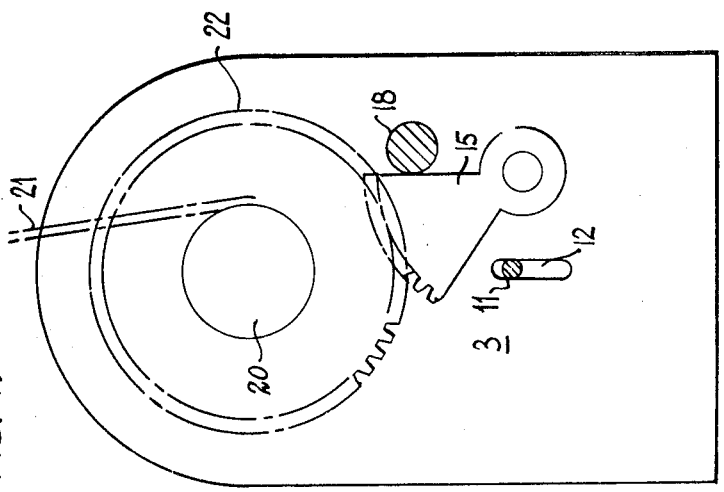
Figure 3:
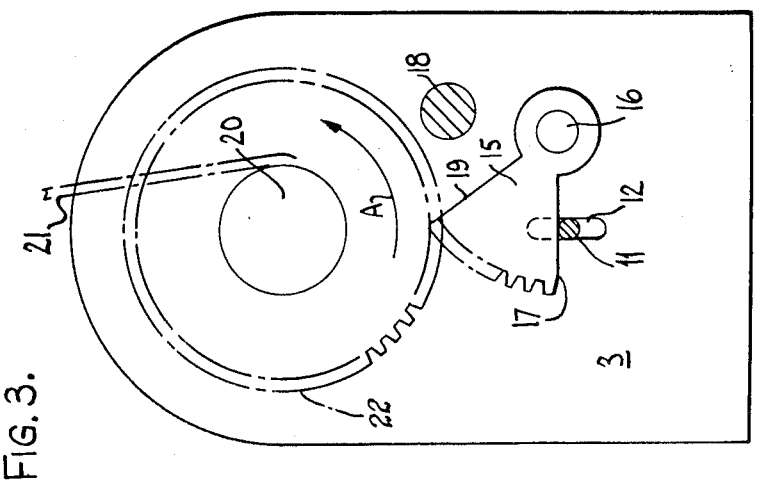
Figure 7:
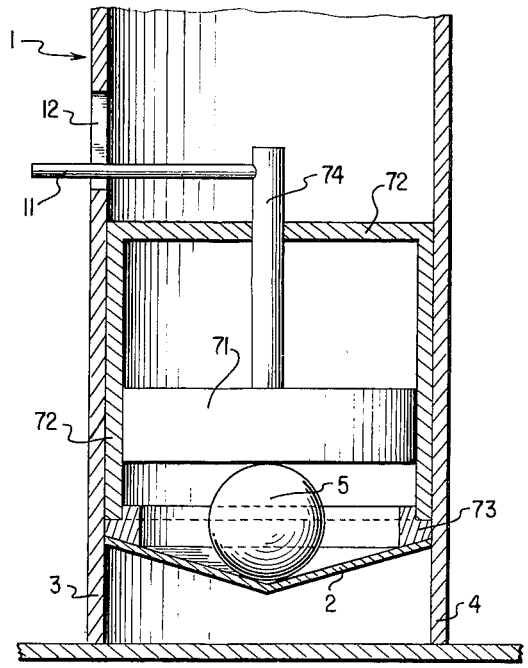
Figure 8A:
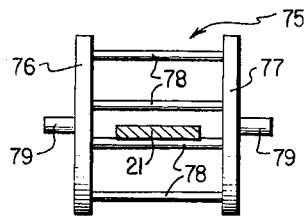
Figure 8B:
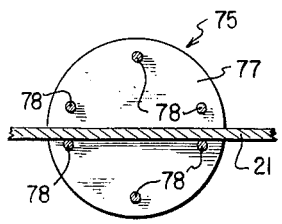
Figure 8C:
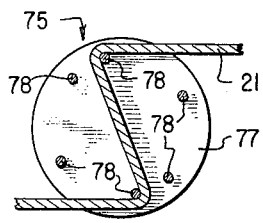
Figure 9A:
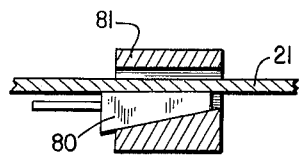
Figure 9B:
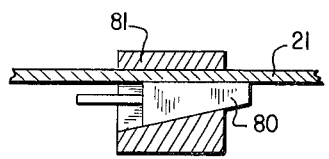

The present invention is now described by way of example with reference to the accompanying drawings in which:

FIGURE 1 shows schematically the bottom half of an inertia lock according to the present invention, in the unlocked position, FIGURE 2 shows a similar view to that of FIGURE 1, but with the inertia lock in the locking position, FIGURE 3 shows a side elevation of the inertia lock again in the unlocked position, FIGURE 4 shows a side elevation of the inertia lock in the locked position, FIGURE 5 shows schematically a single inertia lock coupled by an electrical circuit to two belt storage housings, FIGURE 6 shows schematically a single inertia lock coupled by a fluid circuit to two belt storage housings, FIGURE 7 shows schematically the bottom half of an inertia lock in an alternative arrangement, in the unlocked position, FIGURES 8A, 8B, and 8C show a modified locking device of the cage type, and FIGURES 9A and 9B show a locking device of another arrangement.

Referring to FIGURE 1, the inertia lock comprises a casing 1 which is firmly secured, for example by bolting, to the main frame or chassis of the vehicle, e.g., motor car, in which the inertia lock is to be used. A wide angled conical dished support 2 is positioned near the base of the casing 1 and secured to its side walls 3 and 4. An inertia member 5 in the form of a ball rests on the support 2 and suitably has a diameter in the range ½" to 1". To give it sufficient mass for it to perform satisfactorily, the ball is made of metal, but it may be made of other material, for example hard synthetic resin, in which case it may be weighted by encasing a metal mass in the resin.

A circular plate 6 is secured to an arm 7 formed at one end with a barrel shaped projection 8 of reduced diameter which is received between edge bearings 9 in an aperture 10 of the side wall 4 of the casing 1. The other end of the arm 7 is provided with a projection 11 protruding through a slot 12 in the side wall 3 of the casing 1.

The inertia ball 5, as shown in FIGURE 1, is at its normal position of rest at the bottom of the conical dished support 2, and the plate 6 resting on top of the ball 5 is angled downwardly so that the extension 11 lies towards the bottom of the slot 12. Should the vehicle in which the inertia lock is mounted be subjected to sudden acceleration or deceleration or change in direction of movement, the ball will move from the bottom of the dished support 2 and roll up the inclined conical surface thereof, the ball moving in a direction opposite to that of the vehicle, i.e., if the vehicle accelerates, the ball will move in a direction towards the back of the vehicle and vice versa if the vehicle decelerates the ball will move in a direction towards the front of the vehicle; likewise if the vehicle turns to the right, the ball will roll towards the left hand side of the vehicle. The inertia lock is thus omni-directional and when the inertia ball 5 rolls up the inclined surface of the dished support, so it lifts the plate 6 and arm 7 so that the extension 11 thereof moves towards the top of the slot 12. This is to be seen in FIGURE 2.

Referring to FIGURES 3 and 4, a toothed sector 15 is journalled on a pin 16 secured to the side wall 3 of the casing 1. The edge 17 of this sector 15 rests on the projecting extension 11. A stop 18 is also fixed to the side wall 3 of the casing 1 and is arranged to serve as an abutment to limit rotation of the sector 15 in a clockwise direction when an edge 19 of said sector comes up against the stop 18.

A shaft 20 is journalled in the side walls 3 and 4 of the casing 1 and the length of the shaft extending between said side walls serves as a drum or reel on to which a safety belt 21 may be wound. Withdrawal of the belt causes rotation of the shaft in an anticlockwise direction, indicated by the arrow A, and such rotation of the shaft is against the bias of suitable spring means (not shown).

The shaft 20 protrudes through the side wall 3 and on its protruding end there is mounted a pinion 22 which, as will be explained, can be engaged with the toothed sector 15.

When the inertia ball 5 is in its normal position of rest at the bottom of the dished support 2, as shown in FIGURE 1, the toothed sector 15 resting on the extension 11 of the arm 7 is out of engagement with the pinion 22. If, however, the inertia ball 5 moves from the bottom of the dished support 2 up the inclined surface of said support, so lifting the arm 7 and extension 11, through the lifting of the extension 11 the sector 15 may be swung about its mounting pin 16 so that it is brought into engagement with the pinion 22.

Movement of the inertia ball 5 is caused by a sudden change in movement or direction of the vehicle which will not only cause displacement of the inertia ball but also of the wearer of the belt, thereby tending to withdraw the belt 21 and thus rotating the shaft 20 in the direction of the arrow A. It follows, therefore that as soon as the arm 7 is lifted and the sector 15 brought into engagement with the pinion 22, the sector 15 is swung up against the stop 18 so locking the pinion 22 and shaft 20 against rotation in the direction of the arrow A. This is shown in FIGURE 4. The belt 21 is thus positively locked against withdrawal.

As soon as the tension on the belt 21 is released thereby allowing the spring means (not shown) to rotate the shaft 20 and pinion 22 in a clockwise direction, the sector 15 is moved away from the stop 18 back to its normal position of rest shown in FIGURE 3, out of engagement with said pinion. It will be appreciated that when tension on the belt 21 is released, the vehicle must once again be travelling in a normal manner so that the inertia ball 5 will have returned of its own accord to the bottom of the dished support 2 so allowing the plate 6 and arm 7 to drop to their normal positions of rest which are shown in FIGURE 1. Thus it follows that the toothed sector 15 is free to swing back to its normal position of rest.

The inertia operated mechanism comprising the assembly of components shown in FIGURES 1 and 2 may be mounted remote from the locking sector 15 and belt storage housing comprising the shaft 20, belt 21 and pinion 22, remote control means being provided to couple the pivoted arm 7 to the sector 15.

Such remote control means may be a hydraulic or pneumatic fluid circuit or an electrical circuit between the actuating arm 7 and the locking sector 15.

The fluid circuit may be a simple closed circuit whereby an impulse, caused by lifting of the arm 7, causes movement of the fluid which is sensed and transmitted to the locking sector 15. Another arrangement is shown in FIGURE 6 in which a source 50 of fluid pressure acts through a valve 51 in flow lines 52, 53 connected to cylinders 54, 55. Pistons 56, 57 are slidable mounted in these cylinders and their piston rods 58, 59 act on sectors 15. An actuating lever 60 of the valve 51 is connected to the pivoted arm 7 of the inertia operated mechanism indicated at 62. The valve 51 is arranged so that under normal conditions the flow lines 53 are connected to exhaust and the lines 52 to pressure. Thus, the pistons 56, 57 are in their lowered positions whereby the sectors 15 are disengaged from the pinions 22. When the inertia ball of the mechanism 62 is displaced, lifting the arm 7, the valve lever 60 is displaced to reverse the valve 51 whereby the flow lines 53 are connected to fluid pressue and the lines 52 to exhaust. Thus the pistons 56, 57 are raised thereby lifting the sectors 15 into engagement with the pinions 22. The belts associated with the pinions are thus locked against withdrawal as hereinbefore described.

With the arrangement shown in FIGURE 6 a single inertia operated locking mechanism 62 controls two belt storage housings. It will be appreciated that the one locking mechanism could control any number, as desired, of storage housings.

The use of an electrical circuit to connect a single actuating arm 7 to one or more locking sectors 15 is illustrated in FIGURE 5. The locking sectors are biased, by gravity or springs into their inoperative positions away from the stops 18 and are pushed into their operative positions, engaging with the pinions 22 by solenoids 64 arranged to be energised upon the closing of a switch 65 when the actuating arm 7 is lifted.

It is not essential that movement of the inertia ball 5 need cause rocking motion to a pivoted arm, i.e., arm 7.

In the alternative arrangement shown in FIGURE 7, in which previously used reference numbers indicate the same parts, the arm 7 is replaced by a piston 71 slidably mounted in a cylinder 72 held in position by a ring member 73 above the dished support 2. The piston 71 has a piston rod 74 extending outside the cylinder 72 to which the projection 11 is connected. The piston and piston rod thus have straight line reciprocating movement and would be coupled in any of the ways hereinbefore described to a locking sector.

In a further modification, the inertia operated mechanism is adapted, upon displacement of the actuating arm, to actuate a device arranged to apply a locking action directly upon the belt to prevent further movement thereof in a withdrawal direction. Such a locking device is shown diagrammatically in FIGURES 8A, 8B, and 8C, and comprises a cage 75 formed by discs 76, 77 and cross members 78, the cage being mounted for angular movement upon central pins 79 and the belt 21 being threaded through the cage. With such an arrangement when the cage is in an operative position as shown in FIGURES 8A and 8B, the belt would have a straight line movement therethrough but when the cage is turned into its locking position, the position illustrated in FIGURE 8C, the belt is twisted or folded to have a "Z" or "S" configuration through the cage whereby it frictionally engages with the cross members 78 of the cage such that it cannot pass therethrough.

In another arrangement illustrated in FIGURES 9A and 9B, the locking device may comprise a movable wedging member 80 which when in its operative locking position of FIGURE 9B wedges or jams the belt 21 against a fixed support 81.

What we claim is:

1. An inertia operated locking mechanism for a safety belt including an actuating member, an inertia member, a dished support in which said inertia member rests, and a locking member associated with said actuating member, said actuating member being mounted so as to be displaceable upon movement of said inertia member in any direction from a central portion of said dished support, said locking member being arranged, upon actuation of said actuating member, to restrain said safety belt against movement in the withdrawal direction.

2. An inertia operated locking mechanism according to claim 1, wherein said support is a generally conical dished support and said inertia member comprises a ball normally resting in the bottom of said conical dished support so that when the mechanism is upright the inertia member will automatically rest at the bottom of said support.

3. An inertia operated locking mechanism according to claim 2 wherein said actuating member comprises a plate pivoted at one side to rest directly on said inertia ball, the size of the latter and the location of the pivot being arranged so that the plate is lifted automatically in whatever direction the inertia ball is displaced.

4. An inertia operated locking mechanism according to claim 2 wherein said actuating member comprises a piston slidable in a cylinder above said dished support, said piston resting on said inertia ball, whereby the piston is lifted automatically in whatever direction said inertia ball is displaced.

5. An inertia operated locking mechanism for a safety belt including a housing for a storage portion of said belt, a generally conical dished support a spherical inertia member movable therein, said spherical inertia member resting at the base of said support when the mechanism is inoperative, an actuating member resting on the spherical inertia member and displaceable upon movement, in any direction, of said spherical inertia member from the base of said support, and a locking member to lock said housing against movement in the withdrawal direction.

6. An inertia operated locking mechanism according to claim 5 in which said housing has a rotary portion and wherein said locking member is adapted to be moved into wedging engagement, upon displacement of said actuating member, with said rotary portion, thereby to lock it, reverse motion of said rotary portion tending automatically to move said locking member out of such wedging engagement.

7. An inertia operated locking mechanism according to claim 5 and further including a rotary portion on said housing and a stop on said housing, and wherein said locking member is adapted to mesh with said rotary portion and to engage said stop in the locked position, whereby upon reverse movement of said housing said locking member is moved away from said stop and out of meshing engagement with said rotary portion.

8. An inertia operated locking mechanism according to claim 7 wherein said locking member comprises a toothed sector and said rotary portion comprises a toothed wheel, said toothed sector being journalled so as to be lifted into engagement with said toothed wheel when said actuating member is displaced upon movement of said inertia member.

9. An inertia operated locking mechanism according to claim 7 wherein said locking member comprises a toothed sector, said housing comprises a reel for the storage portion of said belt, and said rotary portion comprises a toothed wheel arranged to rotate with said reel, said toothed sector being journalled so as to be lifted into engagement with said toothed wheel when said actuating member is displaced upon movement of said inertia member.

10. An inertia operated locking mechanism for a safety belt including a generally conical dished support, a spherical inertia member movable therein, said spherical inertia member resting at the base of said support when the mechanism is inoperative, an actuating member resting on the spherical inertia member and displaceable upon movement, in any direction, of said spherical inertia member from the base of said support, a locking device arranged to apply a locking action directly on said belt, and a locking member associated with said actuating member and arranged, upon movement of the spherical inertia member, to actuate said locking device.

11. An inertia operated locking mechanism according to claim 10 wherein said locking device comprises a cage mounted for angular movement, said belt being threaded through said cage so that when said cage is in an inoperative position, said belt will have a straight line movement therethrough and when said cage is turned into its locking position, said belt is twisted or folded to have a "Z" or "S" configuration, whereby the belt frictionally engages with members of the cage such that it cannot pass therethrough.

12. An inertia operated locking mechanism according to claim 10 wherein said locking device comprises a movable wedging member and a fixed support, said wedging member, when in its operative position, wedging or jamming said belt against said fixed support.

13. An inertia operated locking mechanism for a safety belt including a generally conical dished support, a spherical inertia member movable therein, said spherical inertia member resting at the base of said support when the mechanism is inoperative, an actuating member resting on the spherical inertia member and displaceable upon movement, in any direction, of said spherical inertia member from the base of said support, a locking member positioned remote from the remainder of the mechanism and arranged to restrain the belt against movement in the withdrawal direction, and remote control means for effecting actuation of the locking member upon displacement of said actuating member.

14. An inertia operated locking mechanism for a plurality of safety belts comprising a generally conical dished support, a spherical inertia member movable therein, said spherical inertia member resting at the base of said support when the mechanism is inoperative, an actuating member resting on the spherical inertia member and displaceable upon movement, in any direction, of said spherical inertia member from the base of said support, a plurality of locking members, each associated with a different one of said safety belts, the locking members being positioned remote from the remainder of the mechanism and each locking member being arranged to restrain its associated belt against movement in the withdrawal direction, and remote control means for effecting actuation of all of said locking members upon displacement of said actuating member.

15. An inertia operated locking mechanism according to claim 14 wherein said remote control means comprises a hydraulic fluid circuit between said actuating member and each of said locking members.

16. An inertia operated locking mechanism according to claim 14 wherein said remote control means comprises a pneumatic fluid circuit between said actuating member and each of said locking members.

17. An inertia operated locking mechanism according to claim 14 wherein said remote control means comprises an electric circuit between said actuating member and each of said locking members.

18. An inertia operated locking mechanism according to claim 14 wherein said remote control means includes a mechanical linkage between said actuating member and each of said locking members.

19. An inertia operated locking mechanism for a safety belt comprising an actuating member, inertia means for effecting actuation of said actuating member, a dished support in which said inertia means rests, a locking member operatively associated with said actuating member, and means for mounting said actuating member for displacement thereof upon movement of said inertia means in any direction away from a central portion of said dished support, said locking member being arranged to restrain said safety belt against movement in its withdrawal direction whenever said actuating member is actuated by movement of said inertia means.

References Cited by the Examiner
UNITED STATES PATENTS

| | | |
|---|---|---|
| 2,139,666 | 12/1938 | Bogart. |
| 2,403,653 | 7/1946 | Geohegan et al. _____ 297—386 |
| 2,705,529 | 4/1955 | Bull et al. _____ 297—386 X |
| 2,708,555 | 5/1955 | Heinemann et al. ___ 188—135 X |
| 2,708,966 | 5/1955 | Davis _____ 297—386 |
| 3,122,339 | 2/1964 | Whittingham _____ 242—107.4 |

DUANE A. REGER, *Primary Examiner.*

MILTON BUCHLER, *Examiner.*